(12) United States Patent
Tarpley et al.

(10) Patent No.: US 11,734,984 B2
(45) Date of Patent: Aug. 22, 2023

(54) ELECTRONICALLY ACTUATED COIN SLIDER DEVICE

(71) Applicants: John Tarpley, Kansas City, MO (US); Frank Licausi, Kansas City, MO (US); Mike Farnet, Kansas City, MO (US); Roger Donley, Kansas City, MO (US)

(72) Inventors: John Tarpley, Kansas City, MO (US); Frank Licausi, Kansas City, MO (US); Mike Farnet, Kansas City, MO (US); Roger Donley, Kansas City, MO (US)

( * ) Notice: Subject to any disclaimer, the term of this patent is extended or adjusted under 35 U.S.C. 154(b) by 282 days.

(21) Appl. No.: 17/197,501

(22) Filed: Mar. 10, 2021

(65) Prior Publication Data

US 2021/0287475 A1    Sep. 16, 2021

Related U.S. Application Data

(60) Provisional application No. 62/987,565, filed on Mar. 10, 2020.

(51) Int. Cl.
    *G07F 1/04*      (2006.01)
    *G07F 7/08*      (2006.01)
    *G07F 1/02*      (2006.01)

(52) U.S. Cl.
    CPC ............... *G07F 1/047* (2013.01); *G07F 1/02* (2013.01); *G07F 7/0873* (2013.01)

(58) Field of Classification Search
    CPC ......... G07F 1/047; G07F 1/02; G07F 7/0873; G07F 7/0893; G07F 17/3216; G07F 17/3251; G06Q 20/204; G06Q 20/34; G06Q 20/40145
See application file for complete search history.

(56) References Cited

U.S. PATENT DOCUMENTS

| | | | | |
|---|---|---|---|---|
| 3,827,541 | A * | 8/1974 | Greenwald | G07F 5/12 194/226 |
| 3,977,506 | A * | 8/1976 | McNally | G07F 5/08 194/235 |
| 4,559,958 | A * | 12/1985 | Wingerter | G07F 1/047 453/57 |
| 5,360,096 | A * | 11/1994 | Lier | G07F 1/041 194/235 |
| 5,501,631 | A * | 3/1996 | Mennie | G07D 9/008 453/3 |
| 5,667,217 | A * | 9/1997 | Kelly | A63F 7/0005 273/108 |
| 5,984,075 | A * | 11/1999 | Schwarzli | G07F 9/06 194/350 |
| 6,652,381 | B1 * | 11/2003 | Ungaro | G07F 1/02 453/15 |
| 2003/0019264 | A1 * | 1/2003 | Behunin | G07F 9/06 70/428 |

(Continued)

*Primary Examiner* — Thien M Le
*Assistant Examiner* — Asifa Habib
(74) *Attorney, Agent, or Firm* — Avek IP, LLC; Mark C. Young

(57) ABSTRACT

An electronically actuated coin slider provides an appearance and operation similar to a conventional coin-activated slider without the use of coins. A card reader activates the coin slider and allows a user to push the slide bar to actuate a game, machine, or device in a manner similar to that of a convention slider. A servo motor engages or disengages latching hooks to prevent or allow operation of the slide bar.

12 Claims, 5 Drawing Sheets

(56) References Cited

U.S. PATENT DOCUMENTS

| | | | | |
|---|---|---|---|---|
| 2003/0042110 A1* | 3/2003 | Wilfong | ................... | G07F 5/02 194/302 |
| 2003/0085100 A1* | 5/2003 | Harris | ...................... | G07F 5/08 194/259 |
| 2004/0178217 A1* | 9/2004 | Runnels | ................. | G07F 11/18 221/268 |
| 2005/0087423 A1* | 4/2005 | Rasmussen | .............. | G07F 1/04 194/217 |
| 2005/0277378 A1* | 12/2005 | Schimpl | ................ | G07D 9/008 453/18 |
| 2009/0108608 A1* | 4/2009 | Pores | ...................... | B60N 3/12 296/37.1 |
| 2012/0109373 A1* | 5/2012 | Shiomi | ................ | G07F 19/205 700/242 |
| 2016/0307386 A1* | 10/2016 | Katagiri | ................... | G07D 1/06 |
| 2021/0074119 A1* | 3/2021 | Kershbaumer | ......... | G07F 17/38 |
| 2021/0295631 A1* | 9/2021 | Kibihara | ............... | G07D 3/128 |

* cited by examiner

ELECTRONICALLY ACTUATED COIN SLIDER DEVICE

CROSS-REFERENCE TO RELATED APPLICATIONS

This application claims the benefit of U.S. Provisional Patent Application No. 62/987,565, filed Mar. 10, 2020, the disclosure of which is hereby incorporated herein in its entirety by reference.

BACKGROUND

Coin sliders are known in the art for use with gaming equipment, laundry machines, vending machines, and other games, machines and devices to allow actuation of those devices. Typical coin sliders include one or more slots for receiving coins or tokens as payment for the product or service. With the coins inserted, the inserted coins displace a locking mechanism, allowing a user to slide or push the slide bar of the coin slider mechanism inwardly to actuate the game being controlled by the coin slider, or to dispense a product. For example, a coin slider used with a commercial pool table is mechanically coupled to a door mechanism such that when the coin slider is pushed in, the door is opened, and the pool balls are released from a collection bin into the access tray to allow users to play pool.

In other applications the coin slider device may actuate a switch or sensor to begin operation of the game, machine, or device. For example, a coin slider device used with a washing machine may mechanically actuate a switch which begins a timer cycle on the washing machine, allowing it to operate.

Known coin slider devices typically include a locking mechanism that prevents operation of the slide bar of the coin slider unless the proper number of coins are inserted to displace the locking mechanism. They may also include gates, sensors, or other mechanisms to prevent mechanical operation or sliding of the device unless the appropriately sized coins are inserted. Typical coin slider devices further allow the inserted coins to fall through the device once the slide bar is pushed in, with the coins collected in a coin box positioned in an inner cavity of the device.

While conventional coin slider devices are useful, they have numerous drawbacks. Because they require the use of physical coins, those coins must be collected in a container within the game, machine, or device and periodically removed. Thus, such machines require frequent servicing to remove the coins, and are prone to vandalism and damage from attempts steal the coins collected within. And, conventional coin sliders are susceptible to fraudulent use by users using coin-sized slugs or coins from other jurisdictions to actuate the coin slider, thus depriving the owner of the machine of revenue.

Furthermore, in an increasingly cash-free society, many people do not carry cash or coins. Thus, in order to use a game, machine, or device having a coin slider, one must obtain change or tokens, or simply forgo use of the machine. Thus, it can be seen that there remains a need in the art for a coin slider device that provides secure and convenient actuation of games, machines, and devices.

SUMMARY

Embodiments of the invention are defined by the claims below, not this summary. A high-level overview of various aspects of the invention is provided here to introduce a selection of concepts that are further described in the detailed description section below. This summary is not intended to identify key features or essential features of the claimed subject matter, nor is it intended to be used in isolation to determine the scope of the claimed subject matter. In brief, this disclosure describes an electronically actuated coin slider device.

The present invention is directed to an electronically actuated coin slider that provides the look and feel of a conventional coin slider mechanism, providing a user with a familiar operational experience, without the use of coins to enable the device. In one embodiment, the electronically actuated coin slider is enabled by a card reader that verifies a user account, activates the coin slider, and debits the user account for the transaction.

Because the electronically actuated coin slider device mimics the appearance and operation of a conventional coin slider, it can be retrofitted into existing machines and equipment to allow operation using a card reader system, eliminating the need to collect and process coins as with conventional coin sliders.

In one embodiment, upon activation by an external device such as a card reader, control circuitry actuates a servo motor operable to unlatch hooks securing the slide bar, allowing the slide bar to be pushed in by a user in a conventional manner. In one aspect, the time period in which the hooks remain unlatches is configurable by adjusting a width of an activation pulse provided by control circuitry or by the card reader.

DESCRIPTION OF THE DRAWINGS

Illustrative embodiments of the invention are described in detail below with reference to the attached drawing figures, and wherein:

FIG. 5 is a is a perspective view of the electronically actuated coin slider of FIG. 1 with the slide bar pushed in.

DETAILED DESCRIPTION

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" as used herein denote deviations from the exact value in the form of changes or deviations that are insignificant to the function.

Figure 1:
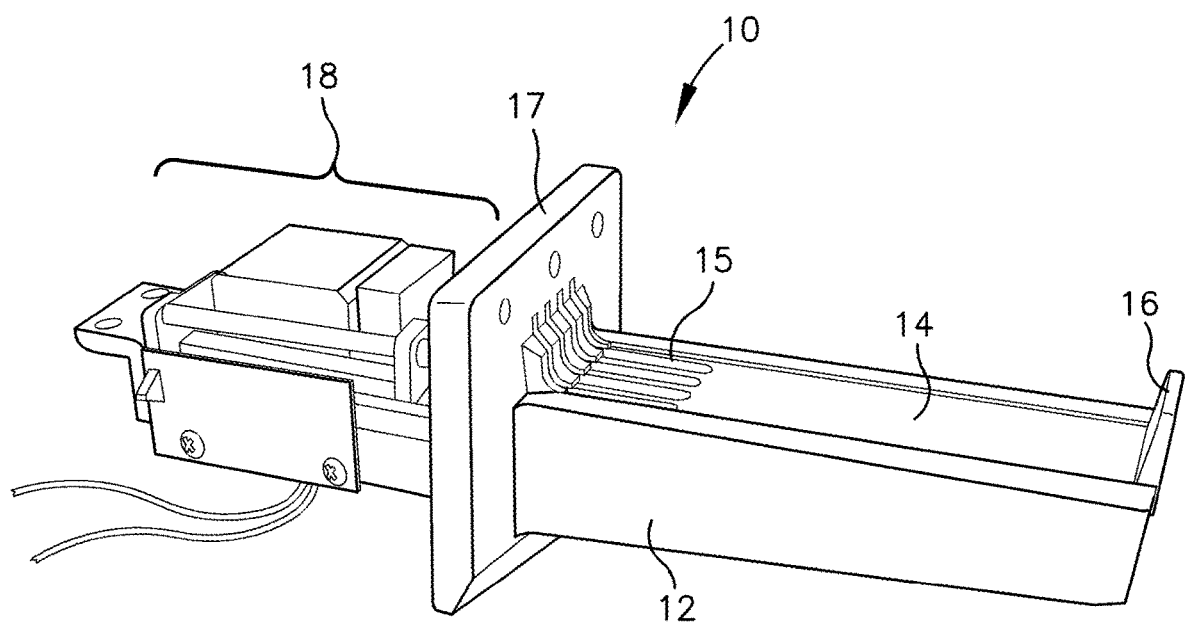
FIG. 1 is a perspective view of an electronically actuated coin slider in accordance with an exemplary embodiment of the present invention.

Looking first to FIG. 1, an electronically actuated coin slider in accordance with an exemplary embodiment of the present invention is depicted generally by the numeral 10. The slider comprises a frame 12 supporting an elongated slide bar 14 such that the slide bar 14 can be moved inwardly and outwardly with respect to the frame 12 on a track or slots within the frame 12. Slide bar 14 extends between first and second ends, with a grip 16 extending upwardly from the outer first end of the slide bar. Grip 16 allows a user to grasp and move the slide bar 14—i.e., slide it inwardly or outwardly. Sliding the slide bar 14 inwardly allows mechanical and or electrical activation of a machine or device via the slide bar 14 mechanically engaging a mechanism within the machine or mechanically operating a switch to activate the machine. For example, the slide bar 14 may mechanically engage with a door mechanism of a pool table to effect actuation of the door to release the collected pool balls to allow play on the table. In a preferred embodiment, coin slots 15 formed in the slide bar are preferably filled to prevent the insertion of actual coins or tokens. In other alternative embodiments, the coin slots may accept coins to allow operation of the slider in a conventional manner in addition to the electronic actuation. Electronic actuation components 18, are positioned at the second end of the slide bar 14 and are operable to latch and unlatch the slide bar 14 as will be described in more detail hereinbelow.

A mounting plate 17 portion of the frame 12 comprises a plurality of mounting apertures to allow the electronically actuated coin slider 10 to be attached to a panel of a game, device, or machine to be actuated, such as the side of a commercial pool table. With coin slider 10 mounted to the game, the interior portion of the device containing the electronic actuation components 18 is positioned within a cavity in the game (e.g., inside the case of the pool table) with the exterior portion of the slide bar 14 and the grip 16 on the exterior of the game to allow a user to push the slide bar 14 to actuate the game.

Figure 2:
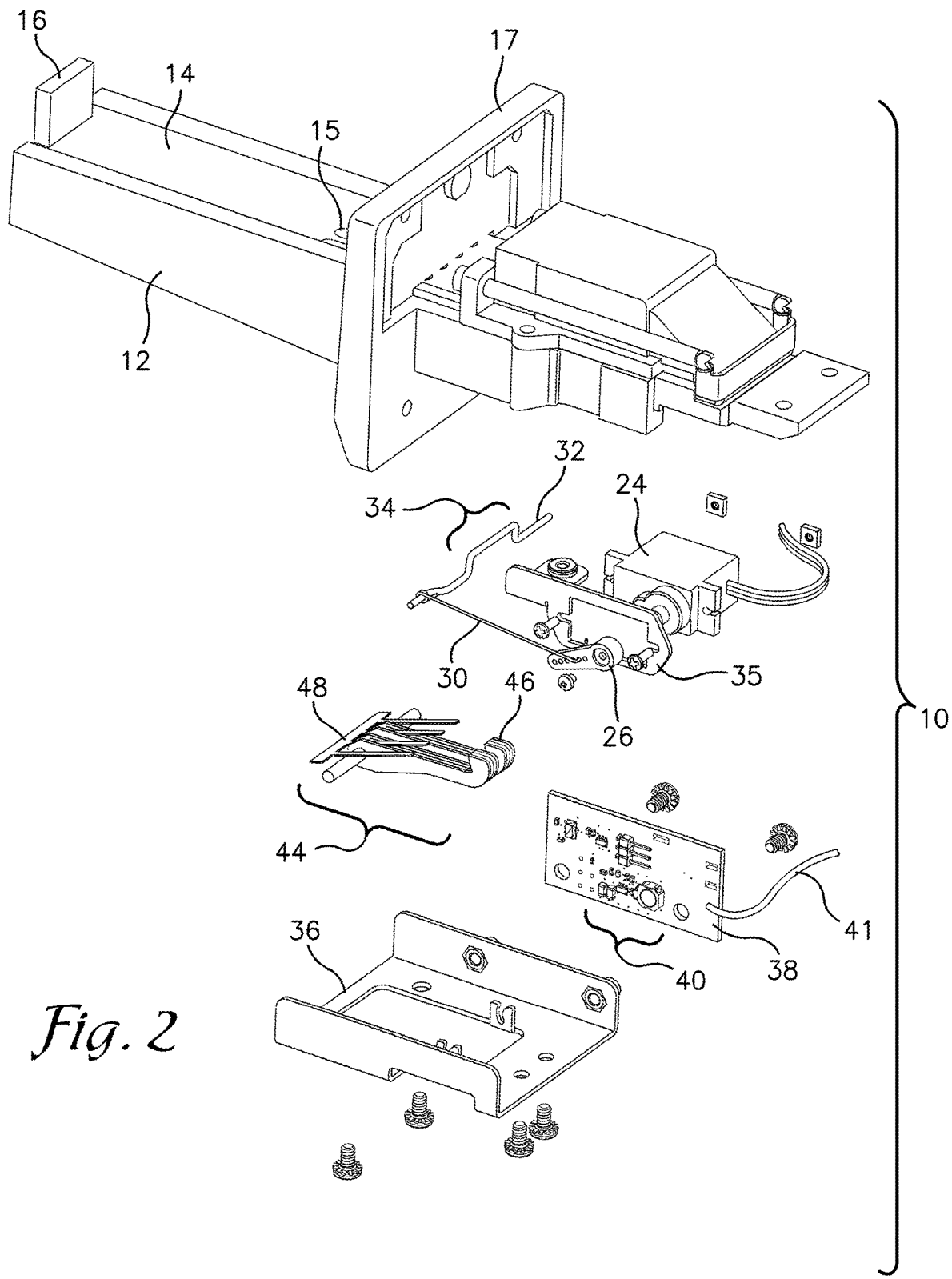
FIG. 2 is an exploded view of the electronically actuated coin slider of FIG. 1.

Looking to FIG. 2, an exploded view of the electronically actuated coin slider 10 of FIG. 1 shows the electronic actuation components 18 that are mounted to the interior portion of the frame 12. the electronic actuation components act to latch the slide bar 14 in place to prevent movement when not actuated, and to unlatch the slide bar 14 to allow movement when actuated.

The actuation components include a servo motor 24 with an elongated control arm 26 attached to the output shaft of the servo motor 24. A wire link 30 is attached to a distal end of the control arm 26 and extends between the control arm 26 and a wire lever 32, with the wire link 30 attached to one end of the wire lever 32. The wire lever 32 is an elongated bar, formed with an offset protruding portion 34 across the mid portion of the lever, the protrusion 34 configured to engage with the latches as discussed below. With the servo motor 24, control arm 26, wire link 30 and wire lever 32 thus attached, it can be seen that actuation of the servo motor 24 causes rotation of the control arm 26 which pushes or pulls (depending on the direction of rotation of the servo motor) the wire link 30 which in turn rotates the wire lever 32.

A motor mount bracket 35 allows attachment of the of the servo motor 24 to the main bracket 36, which in turn attaches to the frame 12. A circuit board 38 comprising control circuitry 40 for commanding and controlling operation of the servo motor 24 is likewise attached to a main bracket 36 using two fasteners as depicted, with a wiring harness 41 allowing connection to a power supply and to the servo motor 24. In a preferred embodiment, power from a power supply is provided to the circuit board 38 and control circuitry 40 through the wiring harness 41, and the actuation signal to the servo motor 24 is provided by the control circuitry 40 through the wiring harness 41. Other configurations of distributing power and interconnecting wiring will be apparent to those skilled in the art and are within the scope of the present invention.

A pawl 44 comprising a plurality of latch hooks 46 and a leaf spring 48 is attached to the main bracket 36. The leaf spring 48 biases the latch hooks into a first, normally latched position. With the actuation components assembled, the offset portion of the wire lever 32 engages with the upper portion of the latch hooks 46. Thus assembled, in the normal latched position, the latch hooks 46 are in an upward position, engaged with the wire lever to prevent movement of the slide bar. When the servo motor 24 is activated, the wire lever 32 is rotated such that the offset portion 34 engages and pushes the latch hooks 46 down, overcoming the bias of the leaf spring 48 and moving the latches downwardly and not engaged with wire lever 32, thus allowing movement of the slide bar.

Preferably, servo motor 24 moves between two positions—a first position in which the control arm 26, wire link 30, and wire lever 32 do not displace the latch hooks 46 so that the hooks engage the offset portion of the wire lever 32, and a second position in which the control arm is positioned such that the wire lever 32 engages and displaces the latch hooks 46 to allow the slide bar 14 to move. Thus, servo motor 24 is activated by a voltage so that, with a voltage applied, the motor 24 actuates the control arm 26 to move to its second position which moves the wire link 30 to cause rotation of the wire lever 32. The wire lever 32 then engages the latch hooks 46 as just described, moving them downwardly and away from the stop bar of the slide bar 14 to allow a user to push the slide bar 14 in, actuating the game. When a voltage is not applied to the servo motor 24, the control arm returns to its initial position, the latch hooks 46 remain engaged with the wire lever 32, and the slide bar 14 cannot be moved.

Control circuitry 40 on the circuit board 38 is configured to accept a power supply input, such as 5 volts DC, 12 volts DC, or other voltage as required by the servo motor 24, and to provide a voltage output to the servo motor 24 based on a received control or actuation signal. For example, upon receiving a control signal comprising a 5 volt, 3 second pulse, the control circuitry would activate the servo motor to unlatch latch hooks 46, thus allowing a 3 second window of time in which the slide arm can be activated. Upon the control signal returning to zero volts, the control circuitry deactivates the servo motor 24, allowing the latch hooks to return to their latched position, preventing operation of the slide arm 14.

It should be understood that the voltages and time durations described are exemplary in nature and not limiting, and that the electronically actuated coin slider of the present invention may operate using any applicable voltages depending on the requirements of the servo motor 24 and the control voltage/pulse provided by an external control device. It should be further understood that the control circuitry itself may be configured to provide the timing pulse to the servo motor, with a short command pulse from an external controller, such as a card reader, instigation the generation of the timing pulse to activate the servo motor in the desired manner. In one exemplary embodiment, the predetermined time period is adjustable and configurable by an installer of the electronically actuated coin slider, in other embodiments, the predetermined time period is configured at the time of manufacture, in still further embodiments, the predetermined time period is adjustable via a control or setting of the control circuitry.

With the structure and actuation components of the electronically actuated coin slider 10 set forth, the operation of the device will now be described with reference to FIGS. 3 through 6.

Figure 3:
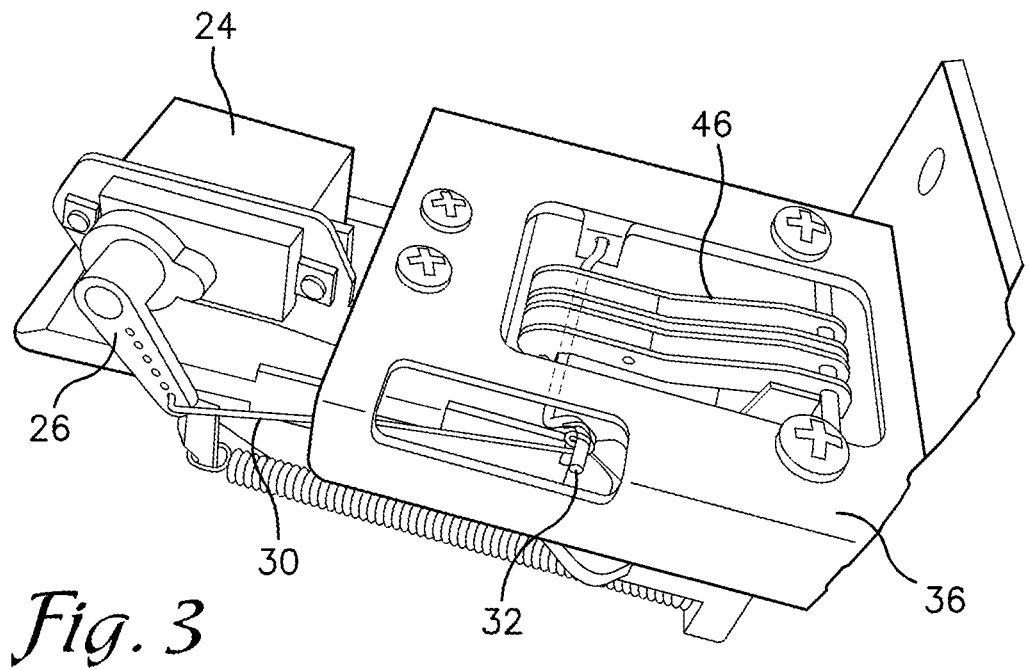
FIG. 3 is a close-up view of the underside of the electronically actuated coin slider device of FIG. 1 showing the latching hooks engaging the stop bar of the slide piece.

Looking to FIG. 3, a close-up view of the underside of the electronically actuated coin slider 10 in the normally latched position is depicted. As seen in this figure, and as described previously, with no voltage applied to the servo motor 24 (hidden from view in FIG. 3 by the circuit board 38 containing the control circuitry 40), the latch hooks 46 engage the wire link 32 preventing the slide arm 14 from being pushed or moved.

Figure 4:
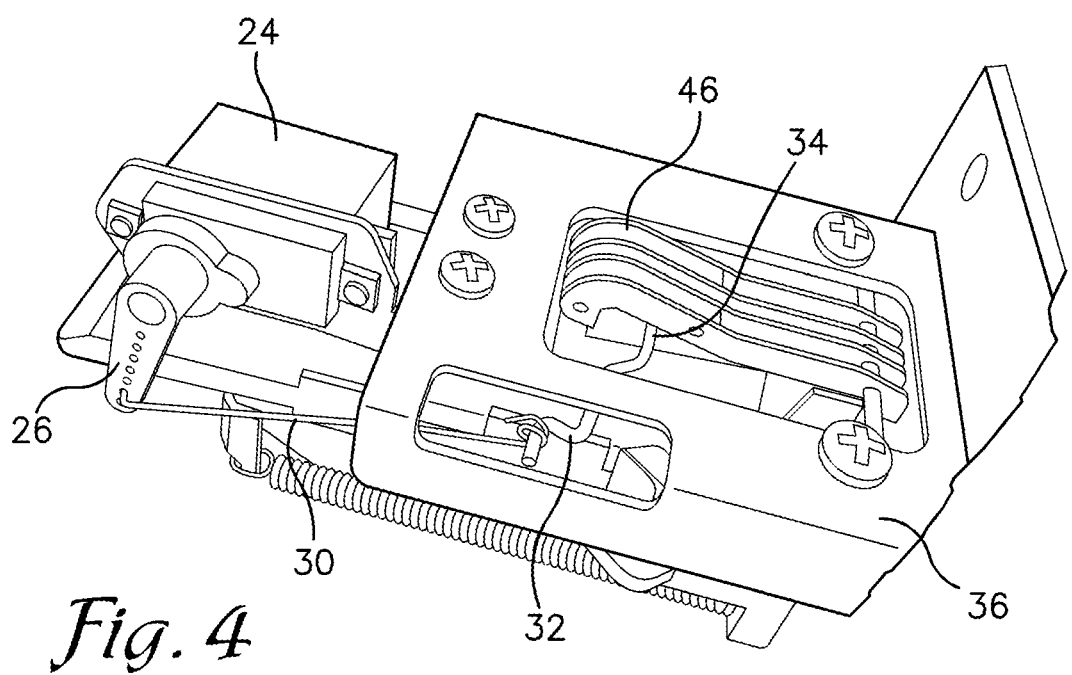
FIG. 4 is a close-up view of the underside of the electronically actuated coin slider device of FIG. 1 showing the latching hooks disengaged from the stop bar of the slide piece.

Looking to FIG. 4, with a voltage applied to the servo motor 24, the latch hooks 46, are displaced by the wire lever 32 as previously described, thus allowing the slide bar 14 to be pushed in to activate the game or device.

Figure 5:
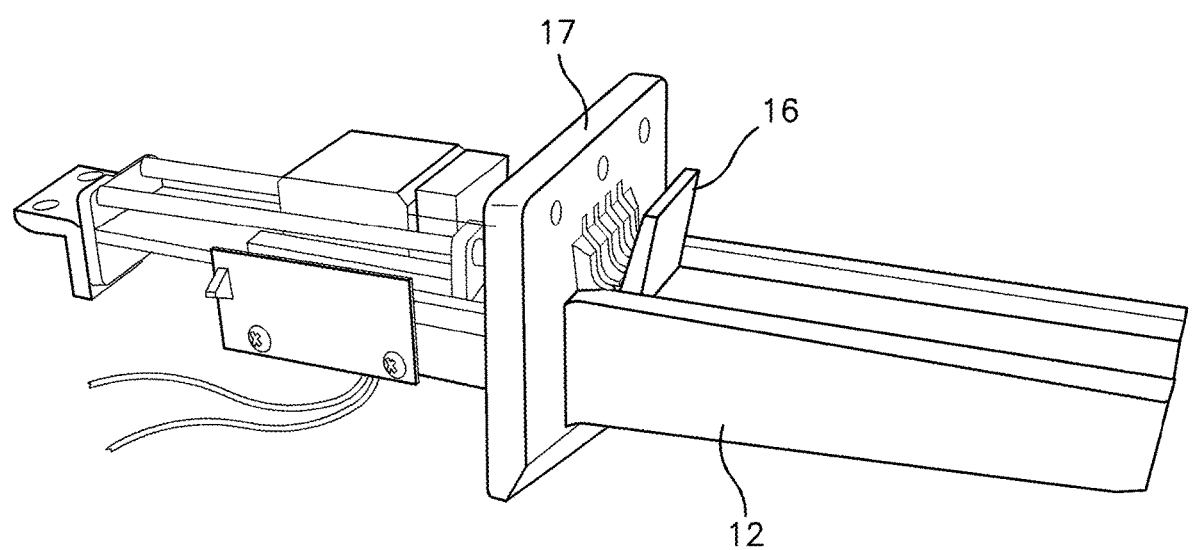

As depicted in FIG. 5, with the latch hooks 46 disengaged as in FIG. 4, the slide bar 14 is shown pushed inwardly which, as described previously, actuates a mechanical linkage or switch which in turn activates the game or device with which the coin slider 10 is used.

Figure 6:
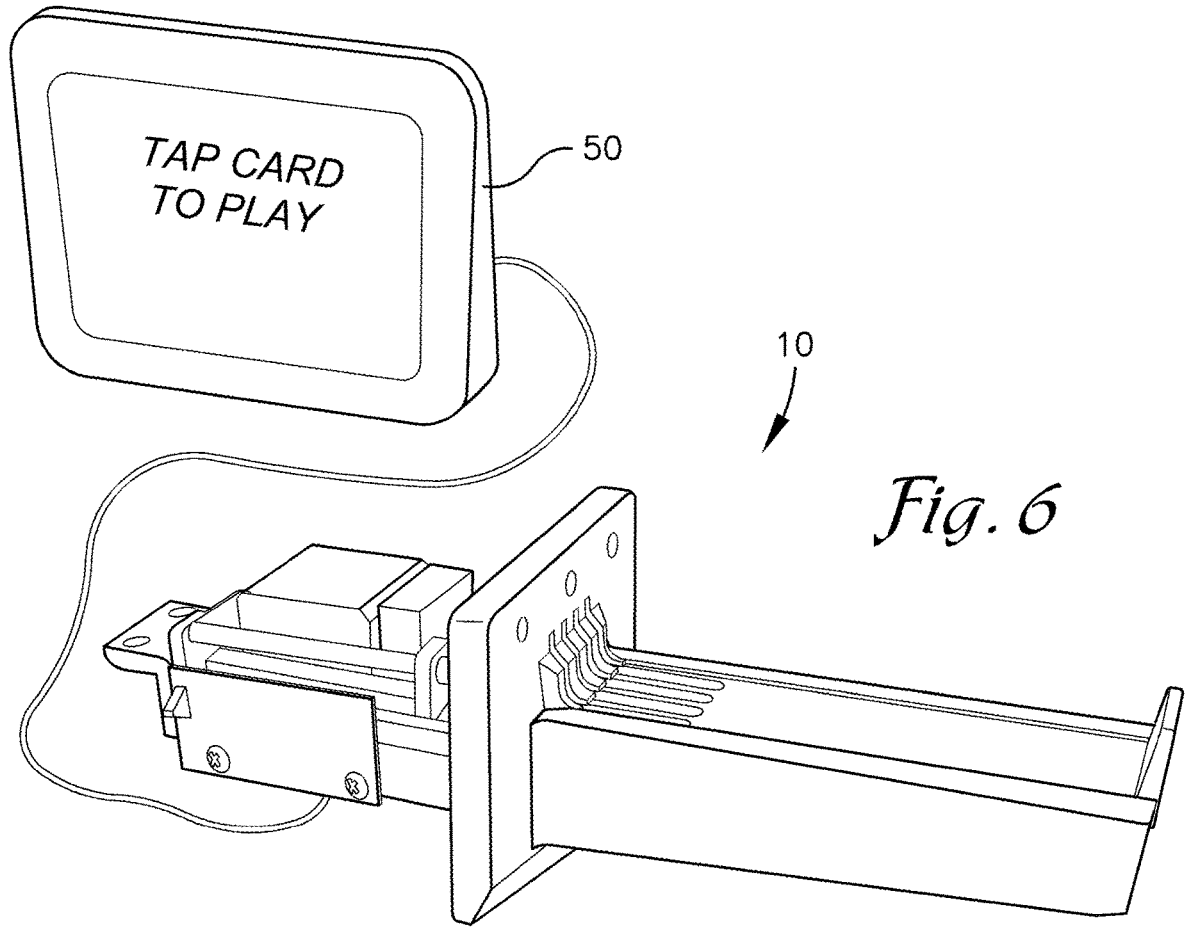
FIG. 6 is a perspective view of the electronically actuated coin slider of FIG. 1 in communication with a card reader verification device.
Figure 7:
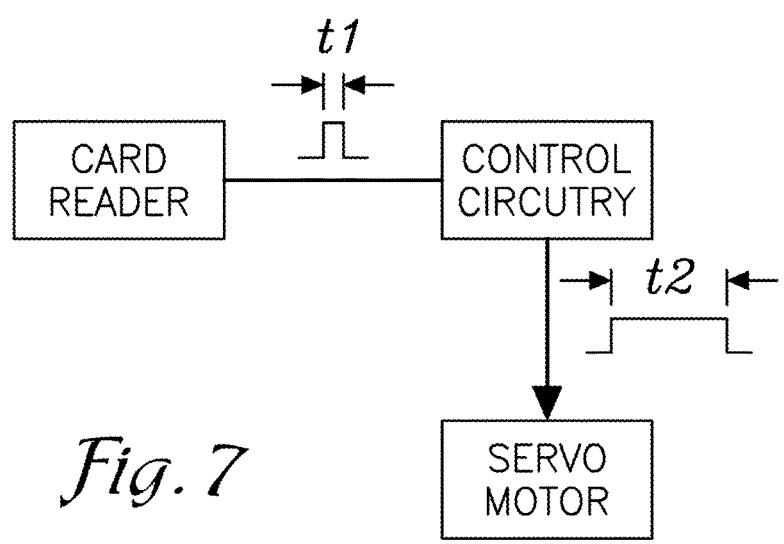
FIG. 7 is a block diagram of a card reader system used in conjunction with an electronically actuated coin slider in accordance with an exemplary embodiment of the present invention.

Turning to FIGS. 6 and 7, in an exemplary embodiment of the present invention a card reader 50 is operable to detect a user's identification card and to activate the electronically actuated coin slider in response. Card reader is preferably an RFID reader, but may be any other proximity, magnetic stripe, or other card reader known in the art. In other exemplary embodiments the card reader may be any verification device, such as fingerprint detector, voice recognition device, keypad, or other user input identification and verification device.

In the exemplary embodiment of FIG. 6, upon a user placing a verification card within proximity of the card reader 50, the card reader provides an activation pulse to the electronically actuated coin slider device 10. In the manner previously described, the activation pulse triggers the control circuitry of the device to actuate the servo motor for a predetermined amount of time in which the latch hooks 46 are disengaged from the wire lever 36, allowing the slide bar to be pushed in by a user to activate the game, machine, or device.

Preferably, the card reader 50 is in communication with a central system that provides verification of a card and/or of a user of the card, and with an account associated with that card and/or user before providing an activation pulse. In other embodiments, the card reader and/or the card may store some or all of the required account and verification information.

An exemplary operation of the embodiment of FIG. 6 is depicted in FIG. 7, with the card reader in communication with the control circuitry of the coin slider device, and with the control circuitry operable to control the servo motor. In the depicted configuration, upon verification of a card and/or user by the card reader, an activation pulse having a voltage amplitude, and a width of t1 is sent to the control circuitry. Upon receipt of the activation pulse, the control circuitry generates a servo motor control pulse having a voltage amplitude and a width of t2. For example, the activation pulse may have a width t1 of 500 milliseconds, with a servo motor control pulse having a width of 5 seconds—thus providing 5 seconds in which the latch hooks are disengaged, and the slide bar can be pushed to activate the game. In other embodiments, the control circuitry may mirror the pulse provided by the card reader such that a 5 second t1 pulse from the card reader results in a 5 second t2 pulse from the control circuitry. In further embodiments, the t1 pulse from the card reader may directly control the servo motor. These and other variations are within the scope of the present invention.

From the above, it can be seen that the system and method of the present invention can be employed to activate a game, machine or device using a familiar coin slider type mechanism, without requiring the use of coins and in conjunction with a modern card-based activation system.

While the system and method of the present invention have been described herein with respect to specific exemplary embodiments, it should be understood that the device of the present invention may similarly be employed in conjunction with other system configurations and power sources. For example, the servo motor and control circuitry may be configured to work with any desired voltage or power supply. In some configurations the power supply for the servo motor may be derived from the game or machine power, in other configurations the card reader device may provide power to the servo motor and control circuitry. These and other variations are contemplated by the present invention.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. An electronically actuated coin slider, comprising:
   a frame configured to mount to a game or machine;
   a slide bar extending between first and second ends positioned in and supported by the frame and slidable between first and second positions;
   a latch hook attached to the frame and movable between a first latched position in which the latch hook prevents movement of the slide bar and a second unlatched position in which the latch hook allows movement of the slide bar;
   a servo motor coupled to the latch hook and operable to move the latch hook between the first and second positions; and
   control circuitry operable to command the servo motor to move the latch hook to the unlatched position for a predetermined period of time and to return the latch hook to the latched position upon expiration of the period of time, wherein the period of time is approximately between two and five seconds.

2. The electronically actuated coin slider of claim 1, further comprising a card reader operable to detect a user's card and to provide a signal to the control circuitry instigating command of the servo motor in response to detection.

3. The electronically actuated coin slider of claim 1, further comprising a wire lever coupled between the servo motor and the latch hook, the wire lever configured to displace the latch hook when rotated by the servo motor.

4. The electronically actuated coin slider of claim 3, wherein the wire lever comprised an offset protruding portion configured to engage with the latch hook.

5. The electronically actuated coin slider of claim 1, wherein the latch hook comprises a plurality of latch hooks.

6. A method of actuating a game or machine, comprising:
providing an electronically actuated coin slider according to claim 1;
receiving an activation signal from a verification device;
moving the latch hook to an unlatched position to allow a user to move the slide bar to activate the game or machine.

7. The method of claim 6, wherein the verification device is a card reader.

8. The method of claim 6 wherein the latch hook is returned to a latched position after activation of the game or machine.

9. The method of claim 6, wherein the electronically actuated coin slider further comprises a wire lever coupled between the servo motor and the latch hook, the wire lever configured to displace the latch hook when rotated by the servo motor.

10. An electronically actuated coin slider, comprising:
a frame configured to mount to a game or machine;
a slide bar extending between first and second ends positioned in and supported by the frame and slidable between first and second positions;
a latch hook attached to the frame and movable between a first latched position in which the latch hook prevents movement of the slide bar and a second unlatched position in which the latch hook allows movement of the slide bar;
a servo motor in mechanical communication with a wire link and a wire lever, the wire lever operable to displace the latch hook upon movement transferred from the servo motor through the wire link; and
control circuitry operable to command the servo motor to move the latch hook to the unlatched position for a predetermined period of time and to return the latch hook to the latched position upon expiration of the period of time, wherein the predetermined period of time is between approximately one second an approximately six seconds.

11. The electronically actuated coin slider of claim 10, wherein the predetermined period of time is configurable by an installer.

12. The electronically actuated coin slider of claim 10, further comprising a card reader operable to detect a user's card and to provide a signal to the control circuitry instigating command of the servo motor in response to detection.

* * * * *